Oct. 9, 1923.
C. STEENSTRUP
1,470,503
METHOD OF MAKING BLADE RINGS
Filed July 3, 1920  2 Sheets-Sheet 1
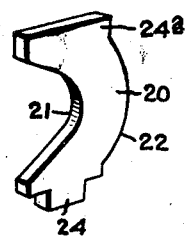
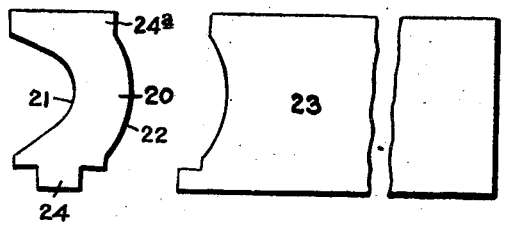
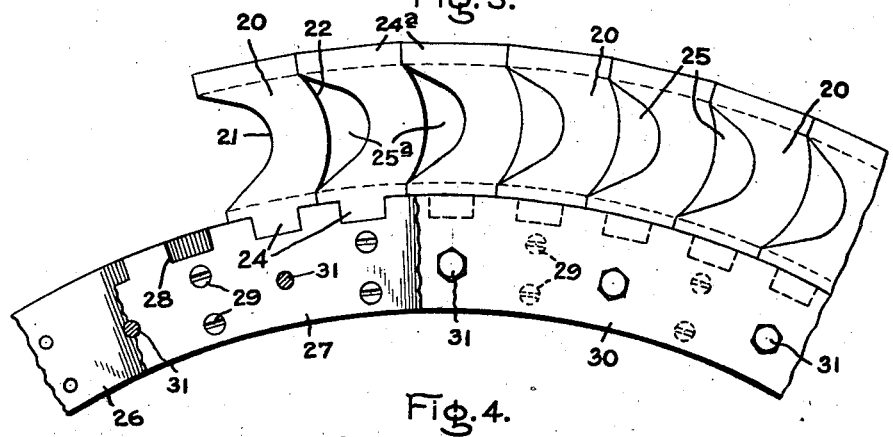
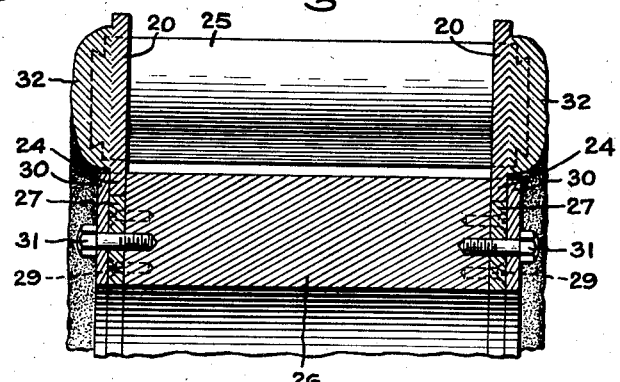
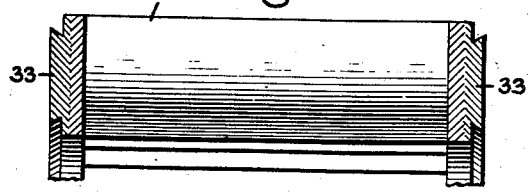
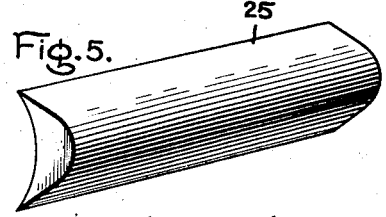
Inventor:
Christian Steenstrup,
by *Albert G. Davis*
His Attorney.

Oct. 9, 1923.
C. STEENSTRUP
1,470,503
METHOD OF MAKING BLADE RINGS
Filed July 3, 1920    2 Sheets-Sheet 2
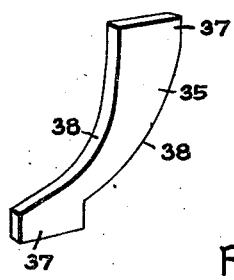
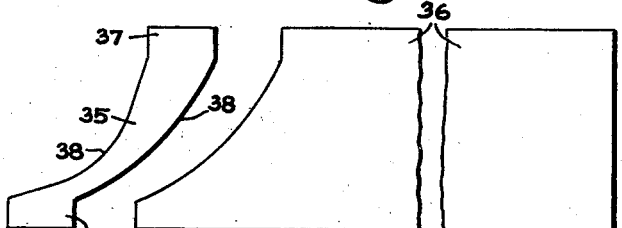
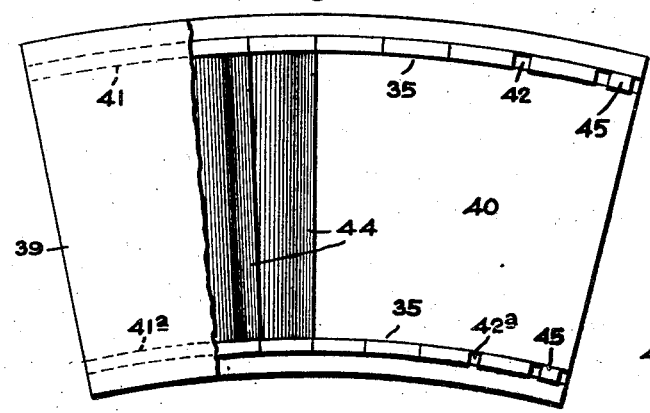
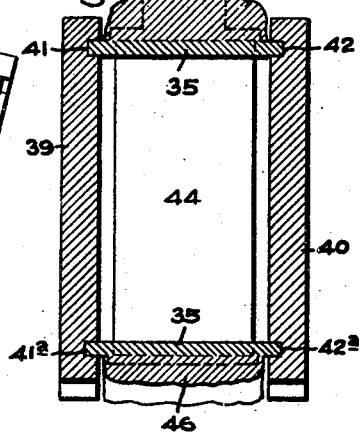
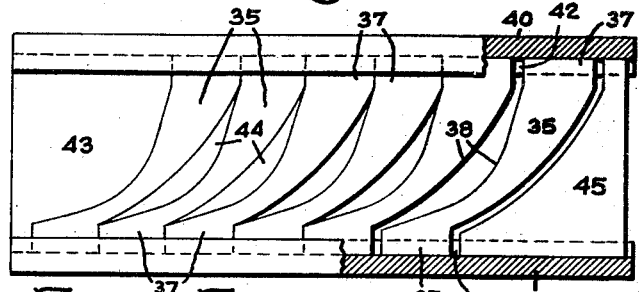
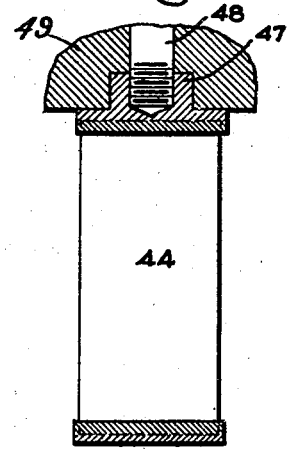
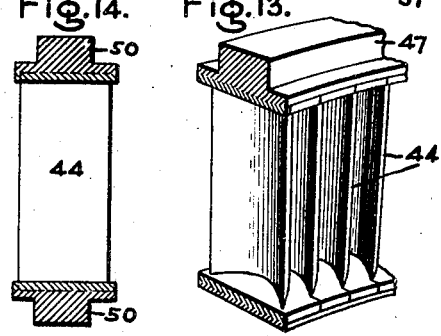
Inventor:
Christian Steenstrup,
by *Albert G. Davis*
His Attorney.

Patented Oct. 9, 1923.

1,470,503

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MAKING BLADE RINGS.

Application filed July 3, 1920. Serial No. 393,934.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Making Blade Rings, of which the following is a specification.

The present invention relates to blade rings for elastic fluid turbines and has for its object to provide an improved method of making the same.

For a consideration of what I believe to be novel and my invention, attention is directed to the accompanying description and the claims appended thereto.

In the drawing, Fig. 1 is a perspective view of a spacing block used in carrying out my method; Fig. 2 is a side elevation illustrating the manner of making spacing blocks as shown in Fig. 1; Fig. 3 is a side elevation of a part of a holding ring, illustrating the manner of building up thereon a blade ring; Fig. 4 is a transverse sectional view of the arrangement shown in Fig. 3 and illustrating a further step in carrying out my method; Fig. 5 is a perspective view of a turbine blade used in making a blade ring; Fig. 6 is a transverse, sectional view of a part of a completed blade ring made in accordance with my invention; Fig. 7 is a perspective view of a spacing block of modified form; Fig. 8 is a side elevation of a spacing block as shown in Fig. 7 and illustrating the manner in which it may be made from strip material; Fig. 9 is a side elevation with parts broken away illustrating the manner of building up a blade ring; Fig. 10 is a top plan view of the parts shown in Fig. 9; Fig. 11 is a transverse sectional view of a built-up structure as illustrated in Figs. 9 and 10 showing an additional step of my method; and Figs. 12, 13 and 14 are views illustrating applications to which a blade ring built up in accordance with my improved method is adapted.

Referring first to Sheet 1 of the drawing, I have here illustrated my method as applied to making a blade ring adapted for use in connection with a turbine of the radial flow type wherein the blades extend in an axial direction.

In carrying out my invention, I provide spacing blocks 20 as illustrated particularly in Figs. 1 and 2. Such spacing blocks have curved surfaces 21 and 22 of a contour to conform to the concave faces and convex backs of the buckets to be used in making the blade ring. As illustrated in Fig. 2 spacing blocks 20 may be cut from a strip of material 23, for example by stamping, and as is obvious, there is little waste of material. At the bottom of each spacing block is a spacing lug 24 and at its top is a spacing lug 24ª. In Fig. 5 I have shown a perspective view of a blade 25 which may be used in carrying out my method. As will be noted, this blade comprises a short length of blading material. Such blades may be cut from strips of blading material which have been shaped by drawing, rolling or the like. By this means, I am enabled to provide blades at a low manufacturing cost and of great uniformity of material.

In building up a blade ring structure I provide a holder comprising a cylinder 26 of a width equal to the finished bucket length and at each end of the cylinder 26 I fasten a ring 27 having circumferentially spaced notches 28 in its peripheral edge. Rings 27 may be fastened in place by means of suitable screws 29. Over each of the rings 27 I then fasten a plate 30 by means of a suitable fastening means, as by bolts 31. As will be seen from Figs. 3 and 4, this forms a cylindrical holding ring having at each end an annular groove divided to form a ring of circumferentially spaced notches 28. The holder may be mounted on a suitable support for convenient use in building up a blade ring structure thereon.

In building up a blade ring structure on the holder, I take spacing blocks as shown in Fig. 1 and buckets as shown in Fig. 5 and place the lugs 24 of the spacing rings in notches 28 mounting the ends of the blades between the blocks. The lugs are of a size to fit firmly in such notches. As will be clear from Fig. 3 when the spacing blocks are assembled around the holding ring there is left between each two spacing blocks an opening 25ª of a size to receive the end of a turbine blade as shown in Fig. 5. The notches 28 are spaced a distance apart to correctly receive successive spacing blocks and to correctly space the blades from each other. I first place two spacing blocks in two notches 28 which are opposite each other. I then place a bucket with its ends against these spacing blocks and then place the next pair of spacing blocks in place against the ends of the bucket after which another bucket is placed against them. This may be continued until the entire ring of buckets is built up around the holder. At the right hand side of Fig. 3 buckets are shown as being in place between the spacing blocks 20 while at the left hand side of the figure two of the buckets have been omitted in order to illustrate the shape of the opening made between two adjacent spacing blocks.

After the bucket ring has been completed on the holder, I then weld the bucket ends and spacing blocks together preferably by means of electric welding, at the same time building up by means of welding a mass of material at the two ends of the blade ring as indicated at 32. In this connection, the blades are preferably made slightly longer than the width of the holder so that when assembled their ends project slightly beyond the outside surfaces of spacing blocks 20. The material 32 is then built up around and between these ends so as to very firmly unite the buckets into a continuous ring. The bucket ring is removed from the holder by cutting off lugs 24 at the periphery of the holder after which the two ends of the blade ring are finished in a manner desired for the use to which the blade ring is to be put.

In certain radial flow turbines blade ring elements are used comprising a number of blade rings as shown in Fig. 6 connected together by reinforcing rings, one end of the blade ring element being connected to a rotor by means of an expansion ring. One application of a ring as shown in Fig. 6 is to form one of the parts of such a blade ring element. Accordingly in Fig. 6 the two ends of the ring are shown as being finished with dove-tail projections 33, and in building up such a blade ring element several rings, as shown in Fig. 6, may be connected together by means of reinforcing rings thereby forming a blade ring element of the type referred to; or if found desirable, the ends of the blade ring as shown in Fig. 6 may be finished in any other suitable manner to adapt it to the use for which it is intended.

My method may be utilized to build up an arcuate section of a blade ring as well as a complete blade ring, a complete ring then being made from a number of such sections. It may also be utilized to build up blading for an axial flow machine. On Sheet 2 of the drawings, I have shown my method utilized to build up blade ring sections adapted for use in a turbine of the axial flow type, that is, the blades in the completed blade ring section instead of extending axially as shown in Fig. 6, extend radially.

In carrying out my invention, as shown on Sheet 2 of the drawings, I provide spacing blocks 35 as shown in Figs. 7 and 8 which may be stamped from strip material 36 as illustrated in Fig. 8. As is obvious from an inspection of Fig. 8, spacing blocks 35 may be stamped from a strip of material such as 36 with substantially no waste. The spacing blocks 35 have spacing lugs 37 at their two ends and their edges are curved as indicated at 38 to conform to the concave and convex surfaces of the front and back of the buckets to be used in building up the blade ring section or blade ring. To build up a blade ring section I provide two parallel arcuate holding members 39 and 40 provided in their opposed faces with radially outer grooves 41 and 42 and radially inner grooves 41$^a$ and 42$^a$. The grooves 41 and 42 and the grooves 41$^a$ and 42$^a$ in the two plates are opposite each other. Members 39 and 40 may be suitably supported in spaced parallel relation to each other as shown in Fig. 11 in any suitable manner, such as by being carried by a suitable holder.

I first place in the upper grooves 41 and 42 and also in the lower grooves 41$^a$ and 42$^a$ an end piece as shown at 43 in Fig. 10 which extends from one member to the other. One edge of the end pieces is straight and flush with the ends of members 39 and 40 and the other edge is curved to conform to the concave curvature of spacing blocks 35. I then place a pair of spacing blocks 35 in position, one with its ends in grooves 41 and 42 and the other with its ends in grooves 41$^a$ and 42$^a$, the same extending from member 39 to member 40. Next a blade of the same general type as that shown in Fig. 5 and indicated by numeral 44 is put in position as shown in Figs. 9 and 10, the blade extending parallel with members 39 and 40 and being of such length that its two ends project slightly beyond the surfaces of blocks 35. Another pair of spacing blocks is then put into position, the ends of the bucket just placed being held between the two pairs of spacing blocks. This assembling is continued until the built-up blade structure extends the full length of the arcuate members 39 and 40, there being two continuous rows of spacing blocks with the bucket ends between them. After the last spacing block is in position, a pair of end pieces 45 of the general nature of those shown at 43 are put in place. With the structure thus firmly assembled, I now weld the spacing blocks and bucket ends together preferably by means of electric welding at the same time building up by means of welding a mass of metal at the two ends of the blade section as indicated at 46 in Fig. 11.

The complete built-up structure is now removed from members 39 and 40 and the ends finished according to the use to which the section is to be put. In Figs. 12 and 13 I have shown it finished, one end with a projection 47 and the other end finished to provide a cover. Such a section may be used as intermediates for a multistage turbine being fastened by bolts as indicated at 48 to the turbine casing 49. A sufficient number of sections may be used to form a complete ring. Again such sections may be used on a rotor of a turbine, or as a part of a nozzle diaphragm. In Fig. 14 I have shown a section finished for this latter purpose, the same being adapted to be fastened in the discharge side of a nozzle diaphragm for directing elastic fluid to a row of buckets. To this end the section may be provided with tongues 50 at its two ends which slide into grooves in the diaphragm, a sufficient number of sections being used to form a complete ring.

It will be seen that by my improved method I am enabled to make blade rings or blade ring sections for either radial flow or axial flow machines in a very expeditious manner and at a low cost. The method is readily adapted for blades of different shapes, lengths and angles and can be carried out without the use of special machinery and without highly skilled labor.

In accordance with the provisions of the patent statutes, I have described the principle of operation of my invention, together with the particular method which I now consider to represent the best manner for carrying it out. I desire to have it understood, however, that the particular method disclosed is only illustrative and that the invention may be carried out with such modifications as come within the scope of the appended claims.

What I claim as new and desire to secure by Letters Patent of the United States, is:—

1. The method of making a blade member which comprises assembling rows of spacing blocks on a holder with blades between the blocks, building up metal at the ends of the blades by welding to fasten the blades and blocks together, and then removing the blade member from the holder and finishing the ends.

2. The method of making a blade member which comprises assembling rows of spacing blocks on a holder with blades between the blocks, the ends of the blades extending slightly beyond the blocks, welding the ends of the blades and the blocks together and building up metal around the blade ends, and then removing the blade member from the holder and finishing the ends.

3. The method of making a blade member which comprises stamping spacing blocks from strip material, mounting the ends of said blocks in a holder to form two rows in spaced relation to each other with blades extending from one row to the other, the ends of the blades being supported between said blocks, welding said blade ends and blocks together and building up metal at such ends, and then removing said blade member from the holder and finishing its ends.

4. The method of making a blade member which comprises providing spacing blocks having spacing lugs at their ends, and blade lengths, mounting said spacing blocks on a holder by means of said lugs to form two spaced rows with the end of the buckets between the blocks and projecting slightly beyond them, welding said blocks together and building up metal around the ends of the blades, and then removing said member from the holder and finishing its ends.

5. The method of making a blade member from spacing blocks and blade lengths which comprises taking a holder having spaced grooves therein, mounting spacing blocks with their ends in said grooves and with blades between the blocks thereby forming two parallel rows of spacing blocks with blade ends held between them, and welding said blade ends and blocks together.

6. The method of making a blade ring from blade lengths and spacing blocks having lugs on one end which comprises providing an annular holder having two spaced annular grooves therein, building up a blade ring structure by arranging bucket lengths in a ring with their ends held between rows of spacing blocks, the lugs of said spacing blocks being supported in said grooves, and welding said spacing blocks and bucket ends together.

7. The method of making a blade ring from blade lengths and spacing blocks having lugs on one end which comprises providing an annular holder having two spaced annular grooves therein, building up a blade ring structure by arranging bucket lengths in a ring with their ends held between rows of spacing blocks, the lugs of said spacing blocks being supported in said grooves, welding said spacing blocks and bucket ends together, and removing the bucket ring thus formed from the holder by cutting off said lugs.

8. The method of making a blade ring from blade lengths and spacing blocks having lugs on one end which comprises providing an annular holder having two spaced annular rings of notches, building up a blade ring structure by mounting spacing blocks with their lugs in said notches and blades with their ends between said blocks, the ends of the blades projecting slightly beyond the blocks, welding the spacing blocks and bucket ends together and building up metal around such ends, and then removing the blade ring from the holder and finishing the ends.

9. The method of making a blade ring from blade lengths and spacing blocks having lugs on one end which comprises providing an annular holder having two spaced annular rings of notches, building up a blade ring structure by mounting spacing blocks with their lugs in said notches and blades with their ends between said blocks, the ends of the blades projecting slightly beyond the blocks, welding the spacing blocks and bucket ends together and building up metal around such ends, and then removing the blade ring from the holder by cutting off said lugs.

10. The method of making a blade member which comprises taking two holders having grooves therein, blades, and spacing blocks, supporting the holders in spaced relation to each other with the grooves facing each other, mounting the spacing blocks in said grooves with the ends of the blades held between them, whereby is built up a structure comprising blades held in spaced relation to each other by spacing blocks at their two ends, and then permanently uniting them to form a unitary structure.

11. The method of making a blade member which comprises taking two holders having grooves therein, blades, and spacing blocks, supporting the holders in spaced relation to each other with the grooves facing each other, mounting the spacing blocks in said grooves with the ends of the blades held between them, said spacing blocks standing at a right angle to the holders and said buckets standing parallel thereto, and then uniting the bucket ends and spacing blocks to form a unitary structure.

12. The method of making a blade member which comprises providing a holding means, blades and spacing blocks, mounting the spacing blocks on the holding means with ends of the blades between them, the blades extending in a direction parallel to the holding means, and then uniting them to form a unitary structure.

In witness whereof, I have hereunto set my hand this 1st day of July, 1920.

CHRISTIAN STEENSTRUP.